United States Patent [19]

Washkewicz et al.

[11] Patent Number: 4,699,178
[45] Date of Patent: Oct. 13, 1987

[54] LOW VOLUMETRIC EXPANSION HOSE

[75] Inventors: Donald E. Washkewicz, Aurora; Harold Belofsky, Ravenna, both of Ohio

[73] Assignee: Parker Hannifin Corporation, Cleveland, Ohio

[21] Appl. No.: 939,232

[22] Filed: Dec. 8, 1986

Related U.S. Application Data

[63] Continuation of Ser. No. 695,012, Jan. 25, 1985, abandoned.

[51] Int. Cl.$^4$ .............................................. F16L 11/02
[52] U.S. Cl. .......................................... 138/125; 87/9
[58] Field of Search ....................... 87/9; 138/125, 129

[56] References Cited

U.S. PATENT DOCUMENTS

| 4,048,362 | 9/1977 | Moring et al. | 138/125 X |
| 4,142,554 | 3/1979 | Washkewicz et al. | 138/125 X |
| 4,336,415 | 6/1982 | Walling | 138/125 X |
| 4,343,333 | 8/1982 | Keister | 138/125 |
| 4,384,595 | 5/1983 | Washkewicz et al. | 138/125 X |
| 4,463,652 | 8/1984 | Monget et al. | 87/1 |

Primary Examiner—Henry J. Recla
Assistant Examiner—Mark J. Thronson
Attorney, Agent, or Firm—Joseph B. Balazs

[57] ABSTRACT

A high burst strength flexible composite hose having low volumetric expansion under pressure includes a thermoplastic core tube, one or more braided reinforcing layers of high strength aramid yarn having a tensile modulus of elasticity of about 17,000,000 psi and a tenacity of more than 20 grams per denier at room temperature, and an outer cover of elastomeric material.

3 Claims, 8 Drawing Figures

LOW VOLUMETRIC EXPANSION HOSE

This application is a continuation of application Ser. No. 695,012, filed Jan. 25, 1985, now abandoned.

BACKGROUND OF INVENTION

This invention relates to flexible hydraulic hose and more particularly, to hydraulic hose that has very low volumetric expansion under pressure and which can withstand high pressure, maintain flexibility, resist kinking and is economical to produce.

Low volume expansion hose is necessary to obtain rapid hydraulic response from one point to another in a long line connection as for example in blowout preventer systems for offshore drilling rigs. In such blowout preventer systems, the hydraulic lines may be on the order of two thousand feet or longer and typically connect a control valve at one end to a pilot operated power valve at the other, operating at a working pressure typically on the order of 3,000 pounds per square inch. It is desired that response time be minimized in applications such as this. If conventional hydraulic hose were used in these applications, since it is made of materials to provide flexible characteristics, it would inherently have an accumulator like effect and a shock absorbing capability which reduces the response time of the system. These characteristics are desirable in many hose applications inasmuch as the expansion or bulging of the hose helps to dissipate pressure surges and the like and generally reduce shocks in the system. In a rapid response system, however, a reduced capability to expand is preferable for the hose construction, which stiff characteristics allow the rapid and precise transmission of pressure changes and the like from one end of the system to the other.

Currently, hose used for this purpose comprises a thermoplastic core tube, one or more reinforcement braids of aramid fiber and a thermoplastic jacket. In particular, a type 29 Kevlar fiber is employed which utilizes the extremely good tensile modulus characteristic of this aramid fiber in providing a strong and yet light weight hose construction which is suitable for extended lengths. While this construction is suitable for lines of moderate lengths, when longer lines are encountered, the time delay in transmission of pressure pulses throughout the system versus cost of the hose becomes more significant and improvement is desired in this regard.

A further problem with prior art hose constructions is the relatively high cost to produce very long continuous lengths of hose inasmuch as the aramid fiber employed is difficult to successfully braid without encountering excessive yarn breaks. In the past, it was necessary in braiding with the conventional aramid yarn, to pass the yarn through an expensive twisting operation and to braid with yarn having a twist of at least two turns per inch. Twisting of the yarn is recommended by the manufacturer to obtain maximum yarn tenacity and other satisfactory yarn characteristics. However, the modulus of aramid fibers is closer to that of fiberglass than to that of nylon or Dacron polyesters or the like, and this high modulus introduces significant problems in the handling of the yarns and a relatively high degree of filament or yarn breakage if satisfactory processing techniques are not employed. The high modulus of the armaid fiber is desirable in providing high strength capabilities within a small hose structure configuration and provides advantageous characteristics for the production of a low volumetric expansion hose, wherein, the integrity of the hose structure is desired to be retained.

SUMMARY OF THE INVENTION

These and other objects are attained in the hose structure of the instant invention primarily by the utilization of a different type of aramid fiber than that in conventional use which fiber has a significantly high tensile modulus resulting in the stiff, yet sufficiently flexible hose structure which is particularly suited for use in a highly responsive system. The hose structure comprises a thermoplastic core tube, one or more reinforcement braids of a specific high tensile modulus aramid fiber, and a thermoplastic cover. Although such high modulus fiber might have been considered in the past, such has not been used primarily because of the higher purchase cost compared to the lower modulus Kevlar 29 yarn. An unexpected discovery which enabled attainment of the instant design of hose structure was that the higher modulus aramid yarn braidability was superior to that for the yarns previously in use. Previously it was necessary in braiding with the conventional yarn to pass same through an expensive twisting operation and to braid with yarn having a twist of at least two turns per inch. Otherwise, excessive yarn breaks were obtained. With the high modulus aramid fiber, it was determined that the pre-twisting was unnecessary and that the yarn could be braided very successfully with producers twist of about one half turn per inch. The reasons for the superior braidability are not clearly understood but do result in reduced costs.

One type of high modulus aramid yarn which is suitable for use within the teachings of this invention is that designated as Kevlar 49 fiber, this being a trade designation of E.I. DuPont Company as is that of Kevlar 29 fiber. Reduced scrap levels are achieved resulting in an increase in the probability of generating very long continuous lengths of hose, thereby, rendering the production process more efficient. Comparative testing indicates that the instant construction provides a lower volumetric expansion characteristic than a commercially available version of the hose. Also, the instant invention shows similar advantages as well as the advantage of a less bulky and less costly construction over a two braid competitive construction which currently is commercially available.

DESCRIPTION OF THE PREFERRED EMBODIMENTS

Figure 1:
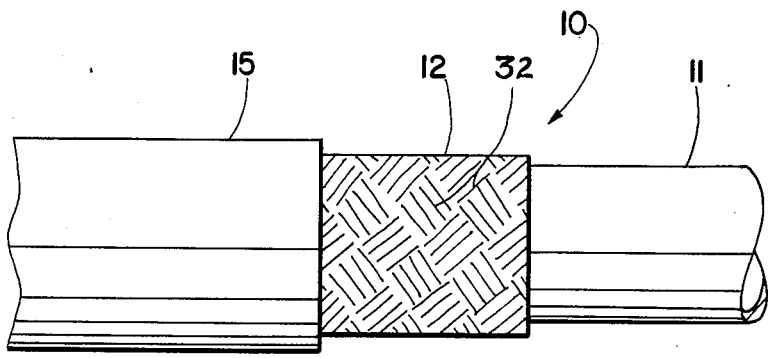
FIG. 1 is a side view, partly broken away in successive structural layers of a hose made in accordance with the present invention having a single layer of braided aramid fiber reinforcement.

Referring now to the drawings, FIG. 1 illustrates a hose 10 having a core tube 11, a layer of reinforcement material 12, and an outer cover 15. The material utilized for the core tube 11 and cover 15 may be selected from any of the well known synthetic polymers used in the hose industry to produce reinforced hose such as nylon, Hytrel, polyurethane or the like. The material selected for the cover 15 may be the same as or different from the material chosen for the core tube 11.

Reinforcement layer 12 is composed of a high modulus aramid fiber supplied as an untwisted or producers twist yarn which has a minimal number of twists, on the order of one half twist per inch. The aramid yarn is available from E.I. DuPont Company and is sold under the tradename Kevlar and in particular, that material designated as Kevlar 49.

Figure 2:
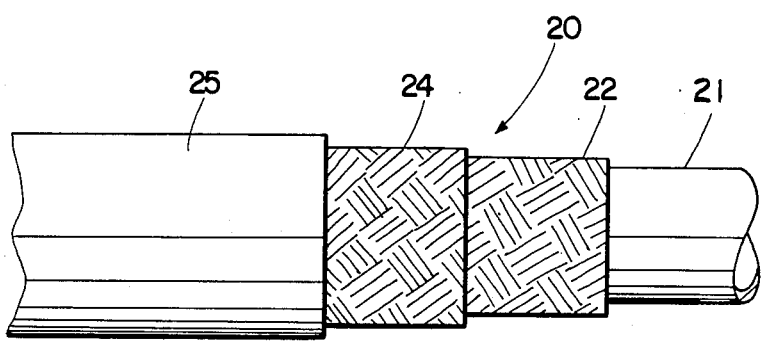
FIG. 2 is a side view, partly broken away in successive structural layers of another embodiment of a hose in accordance with the present invention having two braided aramid fiber reinforcement layers.

FIG. 2 describes another embodiment of the invention having a similar construction wherein a hose 20 has core tube 21 covered with a first reinforcement layer 22, in turn covered with a second reinforcement layer 24, the structure then sheathed by cover 25. In the embodiment described in FIG. 2 hose 20 may have very similar characteristics to hose 10 described in FIG. 1 except that the reinforcement effects are distributed in two or more layers 22, 24. This provides advantages over the FIG. 1 embodiment of the invention which might well be expected including a higher burst strength capability and reduced flexibility, together with the disadvantage of a larger hose structure and consequent additional costs due to additional processing steps and/or quantity of materials utilized. In the description of the invention which follows, reference will be made only to the FIG. 1 embodiment opposed 10, although similar advantages are achieved in the FIG. 2 embodiment.

Figure 3:
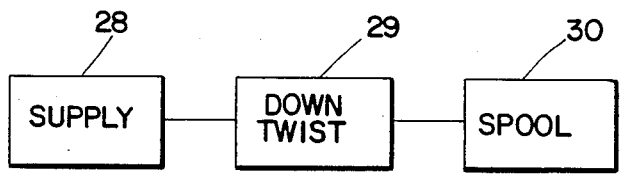
FIG. 3 is a schematic diagram of a portion of a prior art process for manufacturing hose similar to the instant invention.

Referring to FIG. 3, a general description of recommended prior art processing of aramid yarns is depicted in the block diagram consisting of supply reel 28, down twist mechanism 29 and take-up spool 30. Twisting of the yarn is recommended to achieve a relatively high figure for tenacity of yarn and generally is recommended to be in the order of from two to six turns per inch. This is significantly greater than producers twist which is a nominal twist applied to the yarn as supplied by the producer and which occurs at the supply reel 28 prior to application to the down twist mechanism 29. Down twist mechanism 29 can be set to any desired twist ratio where upon the resulting strand is applied to take-up spool 30 for storage preparatory to utilization in a hose manufacturing processing line, at the braider stage thereof.

Figure 4:
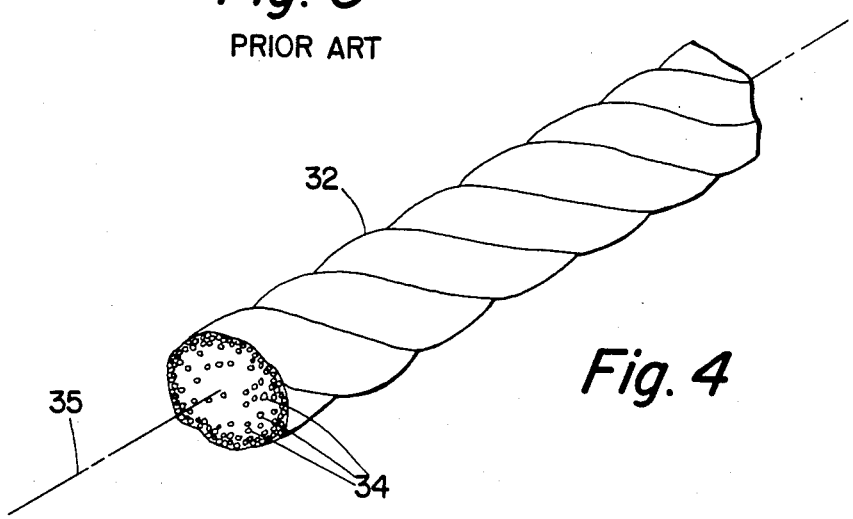
FIG. 4 is an enlarged fragmentary view of a single yarn forming a part of the braided reinforcement of the hose of FIG. 1 or FIG. 2.

In FIG. 4 a single strand 32 of yarn utilized in the teachings of this invention is depicted as comprising plural filaments 34 of the aramid yarn fibrous reinforcement material consisting of Kevlar 49 or the like. The filaments 34 are turned about the axis depicted at 35 with the twist being expressed as the number of such turns per unit of measure. As noted in the preferred embodiment of the invention, approximately one half turn per inch of the filaments 34 is desired in each yarn strand 32.

The yarn strands are then applied to the core tube 11 in a braided pattern as depicted in reinforcement layer 12, wherein one or more strands 32 are wound about core tube 11 and interleaved with other strands 32 in an over and under pattern in a manner well understood in the art. Cover 15 is then extruded over the braided structure.

A preferred embodiment of the invention comprises a nylon 11 core tube 11, Kevlar 49 braid as the reinforcement layer 12 in a single braided arrangement and a urethane cover 15.

As shown by the test results tabulated in Table 1 below, unexpected superior results are obtained from the utilization of Kevlar 49 as the reinforcement layer 12 in this hose design.

TABLE 1

Comparison of Constructions for 3/16" I.D. Hose (3000 psi working pressure)

| HOSE EXAMPLE: | | 1 | 2 | 3 |
|---|---|---|---|---|
| Materials: | Innertube | Nylon 11 | Nylon 11 | Nylon 11 |
| | Braid | Kevlar 29 | Kevlar 49 | Kevlar 29 |
| | No. of Braids | 1 | 1 | 2 |
| | Jacket | Urethane | Urethane | Urethane |
| Braid Design: | Denier | 1500 | 1420 | 1500 |
| | No. ends/carrier | 1 | 1 | 1 |
| | No. carriers/deck | 24 | 24 | 24 |
| | Kevlar O.D., ins. | .28 | .28 | .30 |
| | Hose O.D., ins. | .34 | .34 | .39 |
| Test Results: | Burst press., psi | 13,500 | 13,500 | 20,000 |
| | Movement at 3,000 psi, % | +1 | 0 | — |
| | Volume expansion at 3,000 psi, cc/ft. | .44 | .26 | .26 |

Example 1 is conventional prior art hose of similar configuration utilizing Kevlar 29 material as a reinforcement layer. Kevlar 29 is similar to Kevlar 49 in having substantially the same density of about 0.052 lbs. per cubic inch, an ultimate tensile strength figure on the order of 400,000 lbs. per square inch, and a tenacity on the order of 22 grams per denier. Further, Kevlar 29 has a breaking elongation of 3.6% and a tensile modulus of 9 million lbs. per square inch. Kevlar type 49 differs in these latter respects in having a breaking elongation of 2.5%, and a tensile modulus of 17 million lbs. per square inch.

Example 1 of Table 1 is the current industry product for this type of hose and is seen to have an actual burst pressure of 13,500 lbs. per square inch with a volume expansion figure at 3,000 lbs. per square inch of 0.44 cubic centimeters per foot. This conventional product identified by example 1 has a single braid layer which is formed by a 24 carrier per deck braider to produce hose dimensions as indicated, on the order of, for the reinforcement, an outside diameter of 0.28 inches and a hose outside diameter of 0.34 inches. Movement at 3,000 lbs. per square inch was measured at 1%.

The instant invention is described by example 2 of Table 1 as the hose construction 10 having a single layer of Kevlar 49 braid as the reinforcement layer 12. A thin urethane cover 15 is used. A burst pressure substantially the same as that of example 1 is achieved, being on the order of 13,500 lbs. per square inch. However, significant improvement is noted in the volume expansion figure which is tested to be 0.26 cubic centimeters per foot. A similar improvement is noted in the movement figure which was small enough to be considered insignificant. The results of this test indicate a significant improvement in the hose construction of the instant invention, particularly in the desired volume expansion characteristic.

Example 3 of Table 1 is also a conventional prior art hose configuration currently used for similar applications, differing primarily in having two reinforcement layers of Kevlar 29 material. As indicated, a hose of this construction achieves a significantly higher burst pressure level on the order of 20,000 lbs. per square inch, but results in a similar volume expansion figure as example 2, being on the order of 0.26 cubic centimeters per foot at the 3,000 lbs. per square inch pressure level.

To verify the performance of the hose 10 of the instant invention, a hydraulic response time test was run by an independent testing laboratory, wherein sample hoses identified as the constructions 1 and 2 on Table 1 were cut into 1,100 ft. and 2,200 ft. lengths and connected to input pressures of 1,500 and 3,000 lbs. per square inch. The time to transfer a hydraulic signal the full length of the hose from a pilot shifting valve to a power valve was recorded by pressure transducers. The results are given in Table 2 below and depicted in FIG. 5.

TABLE 2

Response Time vs. Hose Construction, Pressure and Length

| HOSE EXAMPLE: | | 1 (Kevlar 29) | | 2 (Kevlar 49) | |
| --- | --- | --- | --- | --- | --- |
| (1) | Hydraulic Pressure psi | 1500 | 1500 | 1500 | 1500 |
| | Hose length, ft. | 1100 | 2200 | 1050 | 2150 |
| | Time to close, secs. | 2.9 | 7.8 | 2.0 | 5.8 |
| (2) | Pressure, psi | 3000 | 3000 | 3000 | 3000 |
| | Length, ft. | 1100 | 2200 | 1050 | 2150 |
| | Time to close, secs. | 2.3 | 6.3 | 1.6 | 4.5 |

Figure 5:
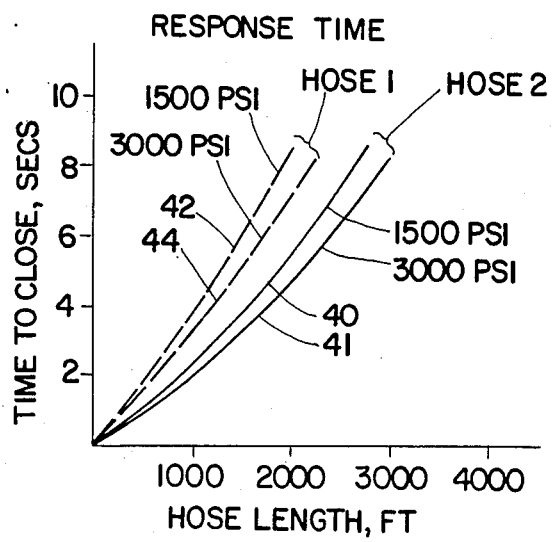
FIG. 5 is a graph of response time plotted against hose length for a hose sample of the invention and a prior art hose.

The data confirms the advantages of the new construction over the same construction with Kevlar 29 yarn. Referring to FIG. 5, this is a graph of the response time of hose examples 1 and 2 of Tables 1 and 2, wherein time to close in seconds is plotted against hose length in feet. The two solid lines 40, 41 are a plot of the test results of hose example 2 from graph 2, while dashed lines 42, 44 are the plots of hose example 1. From FIG. 5, it is seen that the longer the hose length, the greater the advantage in response time for the construction of example 2. This is a significant advantage which finds a response in its commercial success.

Figure 6:
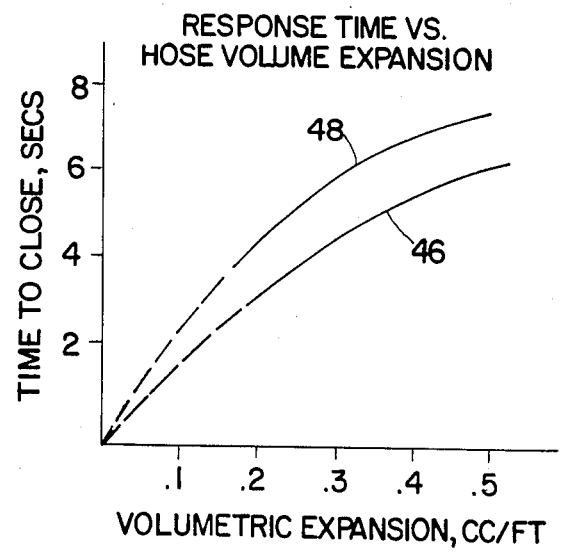
FIG. 6 is a graph of response time plotted against hose volumetric expansion for typical hose constructions.

Referring to FIG. 6, this is a graph included to demonstrate the relationship between response time and volumetric expansion. In this graph the time to close in seconds is plotted against the volumetric expansion in cubic centimeters per foot. In FIG. 6, line 46 is a plot of the characteristics of hose example 2 in a length of 2,200 feet and at a pressure level of 3,000 psi. Line 48 is a plot of the same hose example 2 in a length of 2,200 feet, but with a pressure level application of 1,500 lbs. per square inch. As would be expected, these plots 46, 48 demonstrate that as the volumetric expansion of a hose sample increases, the time to close for a typical application system increases as well in almost a direct relationship at the levels typically encountered for systems of this type. The chart indicates that one way to achieve a faster response time is to utilize a higher pressure system and that the delays in the system are accentuated at the lower pressure levels.

The low expansion hose of the invention has significant advantage for use in any system requiring rapid and an accurate hydraulic response. It will provide a rigid link to transfer power impulses in any high response system. These systems are now found commonly in robotic machinery, metalworking equipment, complex earthmoving and agriculture machinery and the like. The more responsive the hydraulic link, the faster the system can be cycled and the less the amount of compensation required in a control system. These advantages are useful as well in shorter length of hose where response times are considered a critical parameter of the control system.

Figure 7:
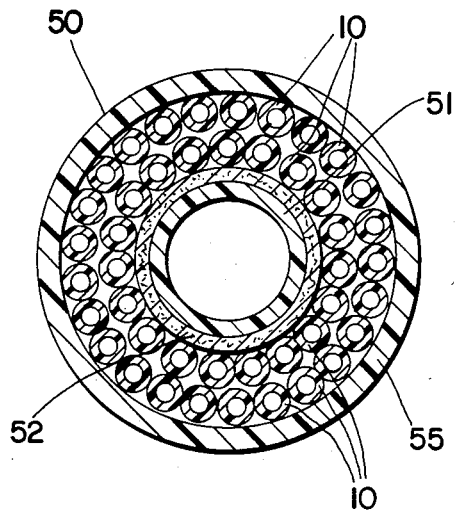
FIG. 7 is a cross section view of a hose bundle comprising a plurality of the hoses of FIG. 1 therein.
Figure 8:
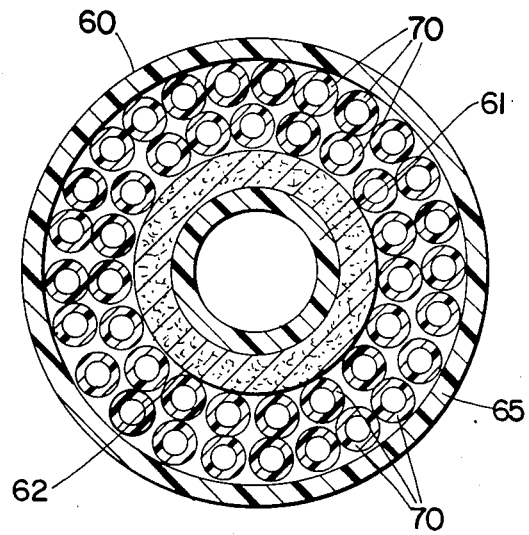
FIG. 8 is a cross section view of a prior art hose bundle similar to and in the same scale as FIG. 7.

FIGS. 7 and 8 compare the advantages of the hose 10 of the instant invention to that of prior art hose when assembled in a long length bundle, typical of blowout preventer systems. Bundle 50, depicted in FIG. 7 comprises an inner hydraulic hose 51 comprised of urethane or the like and which serves as a common return conduit for several control lines. Hose 51 is typically on the order of 1.00 inch inside diameter with an outside diameter on the order of 1.46 inch. Surrounding hose 51 is a layer of filler material 52 which may be fiberglass or the like and which in this embodiment is on the order of 0.130 inch in radial thickness. Surrounding the filler 52 is an evenly arranged circular distribution in two layers of forty-four hoses 10 of the instant invention. Hoses 10 are those described as hose example 2 of Table 1 with an O.D. of 0.34 inch and as such are distributed in an inner circle of nineteen hoses 10 and an adjacent outer circle of twenty-five hoses 10. An outer jacket 55 of PVC, vinyl or urethane, on the order of 0.200 inch radial thickness, encloses the entire structure, resulting in an overall outside diameter of bundle 50 on the order of 3.48 inch.

A similar prior art bundle 60 drawn to the same scale, is depicted in FIG. 8. Substantially the same inner return hose 61 is utilized and the same number of control line hoses 70 are employed as in bundle 50. The control hoses 70 however are the hose example 3 of Table 1 having substantially the same volumetric expansion as that of hose 10, but consisting of a two braid construction resulting in a larger O.D., this being on the order of 0.39 inch. When the forty four control hoses 70 are arranged in concentric inner and outer circles of nineteen and twenty five hoses 70, respectively, a significantly larger bundle 60 structure is produced. In this example, filler material 62 on the order of 0.330 inch radial thickness must be employed to support the hoses 70 while a similar jacket 65 on the order of 0.200 inch radial thickness encompasses the structure. This results in an overall O.D. for bundle 60 on the order of 4.20 inch.

When it is considered that hose bundles 50, 60 are typically on the order of several thousand feet in length it is apparent that significant advantages obtain in cost of materials, size, flexibility and the like over prior art structures which may have the same transient response characteristic and that better response characteristics can be achieved over comparably sized prior art structures.

We claim:

1. A high burst strength flexible composite hose, comprising a flexible thermoplastic core tube,
   one or more layers of fibrous reinforcing material disposed in braided yarns about said core tube, said fibrous reinforcing material having a tensile modulus of at least 17,000,000 pounds per square inch, a tenacity of at least 20 grams per denier at room temperature and an elongation at break of about 2.5 percent, said yarns having a producers twist of about 0.5 turns per inch and less than two turns per inch and no other pre-twist, and a flexible cover of thermoplastic material sheathing said one or more layers of reinforcing material.

2. The hose as set forth in claim 1, wherein said fibrous reinforcing material is Kevlar, an aramid filament having a tenacity greater than 20 grams per denier at room temperature.

3. The hose as set forth in claim 1, wherein said one or more layers of fibrous reinforcing material are applied around said core tube to give a coverage of less than 100 percent.

* * * * *